(12) United States Patent
Kitai et al.

(10) Patent No.: US 11,059,729 B2
(45) Date of Patent: Jul. 13, 2021

(54) LIQUID TREATMENT DEVICE

(71) Applicant: Panasonic Intellectual Property Management Co., Ltd., Osaka (JP)

(72) Inventors: Takahiro Kitai, Hyogo (JP); Genichiro Matsuda, Nara (JP); Gaku Miyake, Osaka (JP); Yoshio Yamada, Hyogo (JP); Naofumi Hino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 89 days.

(21) Appl. No.: 16/199,717

(22) Filed: Nov. 26, 2018

(65) Prior Publication Data
US 2019/0177187 A1    Jun. 13, 2019

(30) Foreign Application Priority Data

Dec. 8, 2017 (JP) .............................. JP2017-236166

(51) Int. Cl.
*C25B 15/08* (2006.01)
*C25B 9/00* (2021.01)
(Continued)

(52) U.S. Cl.
CPC ........ *C02F 1/46109* (2013.01); *C02F 1/4608* (2013.01); *C02F 2001/46133* (2013.01);
(Continued)

(58) Field of Classification Search
CPC .......... C02F 2201/4611; C02F 2303/04; C02F 1/46109; C02F 1/467; C02F 2001/46152; C02F 2201/46115; C02F 1/461; C02F 2201/46135; C02F 2201/46145; C25B 15/08; C25B 9/00; C25B 9/18
See application file for complete search history.

(56) References Cited

U.S. PATENT DOCUMENTS 6,037,715 A    3/2000 Hammon, III et al.
6,264,898 B1   7/2001 Ingram
(Continued)

FOREIGN PATENT DOCUMENTS

JP    2001-523551    11/2001
JP    2004-143519    5/2004
(Continued)

*Primary Examiner* — Zulmariam Mendez
(74) *Attorney, Agent, or Firm* — Wenderoth, Lind & Ponack, L.L.P.

(57) ABSTRACT

A liquid treatment device that achieves an effective treatment by forcibly contacting a swirl flow of a hydrogen peroxide-containing treated liquid with a liquid to be treated that has been processed to contain copper ions or iron ions includes a rod-like first electrode, a plate-like second electrode formed of a copper- or iron-containing metal, and a first treatment vessel that causes a liquid to swirl and generate a gas phase in a swirl flow of the liquid. A pulse voltage is applied to the generated gas phase to generate a plasma. The second electrode serves as an anode, and reaches inside of a supply section for a liquid to be treated. The liquid to be treated containing the generated copper ions or iron ions is forcibly brought into contact with hydrogen peroxide generated by the plasma. In this way, the Fenton's reaction effectively takes place, and the liquid treatment performance improves.

5 Claims, 16 Drawing Sheets

(51) Int. Cl.
*C25B 9/18* (2006.01)
*C02F 1/461* (2006.01)
*C02F 1/46* (2006.01)

(52) U.S. Cl.
CPC ............ *C02F 2001/46171* (2013.01); *C02F 2201/4611* (2013.01); *C02F 2201/4616* (2013.01); *C02F 2201/4618* (2013.01); *C02F 2301/02* (2013.01); *C02F 2305/026* (2013.01)

(56) References Cited

U.S. PATENT DOCUMENTS

| | | |
|---|---|---|
| 2007/0062801 A1 | 3/2007 | Foret |
| 2011/0250098 A1 | 10/2011 | Matveev |
| 2014/0210344 A1 | 7/2014 | Foret |
| 2017/0291830 A1 | 10/2017 | Kang |

FOREIGN PATENT DOCUMENTS

| | | |
|---|---|---|
| JP | 2012-075986 | 4/2012 |
| JP | 2012-228644 | 11/2012 |
| JP | 2013-119043 | 6/2013 |
| JP | 2015-097975 | 5/2015 |
| JP | 5834912 B | 12/2015 |

LIQUID TREATMENT DEVICE

TECHNICAL FIELD

The technical field relates to a liquid treatment device that electrochemically treats liquid. Specifically, the present disclosure relates to a liquid treatment device that treats liquid by generating a plasma in liquid, and forcibly mixing hydrogen peroxide generated by the plasma with a liquid to be treated containing copper ions or iron ions generated from an anode by electrolysis, whereby suspended substances or microorganisms contained in the liquid are decomposed or sterilized through the Fenton's reaction caused by mixing these chemical species.

BACKGROUND

FIG. 14 shows an example of a traditional liquid treatment device. A pair of electrodes 401 is disposed in water, and a high-voltage generator 400 applies voltage to these electrodes 401. This causes discharge in water, and generates hydrogen peroxide. At least one of the electrodes 401 is configured from a copper- or iron-containing metal, and the discharge causes an electrolysis whereby the copper atoms or iron atoms in the electrode dissolve into water, and produce copper ions or iron ions. In the presence of hydrogen peroxide, a Fenton's reaction occurs upon generation of copper ions or iron ions, and produces highly reactive active species OH radicals under the catalytic effect of the copper ions or iron ions. These active species, with their oxidative power, react with the contaminants or other foreign substances contained in the liquid, and treat the liquid by decomposing these substances. With an added configuration that applies ultrasonic waves to the hydrogen peroxide generated by discharge, the device is able to improve its liquid treatment performance with the OH radicals generated by decomposition of the hydrogen peroxide.

SUMMARY

The liquid treatment device described in Japanese Patent No. 5834912 generates hydrogen peroxide and copper or iron ions through discharge, and highly sterilizing OH radicals are generated by causing a Fenton's reaction. However, the OH radicals have a short life, and quickly turn into hydrogen peroxide, which is less sterilizing than OH radicals. This is problematic in terms of treatment efficiency because the OH radicals cannot effectively contact the suspended substance in the water to be treated when the water to be treated has high fluidity.

Under these circumstances, the present disclosure is intended to provide a liquid treatment device that can efficiently generate OH radicals through Fenton's reaction, and improve treatment efficiency even when the liquid to be treated has high fluidity.

A liquid treatment device according to an aspect of the present disclosure includes:

a first treatment vessel that is cylindrical in shape and having a closed end at a first end of a central axis of the vessel and a circular cross section orthogonal to the central axis, the first treatment vessel on a first end side of the central axis having a liquid inlet through which liquid is introduced in a tangential direction of the circular cross section of the vessel, and that causes the liquid to swirl around the central axis and generate a gas phase in a swirl flow of the liquid;

a first electrode that is rod-like in shape and disposed on the first end side of the central axis of the first treatment vessel;

a second electrode made of a copper- or iron-containing metal and disposed on a second end side of the central axis of the first treatment vessel;

a liquid ejecting section through which the liquid is ejected from the first treatment vessel in the form of a treated liquid;

a second treatment vessel in which the treated liquid ejected through the liquid ejecting section mixes with a liquid to be treated;

a power supply that applies a voltage between the first electrode and the second electrode in a way that applies a positive voltage to the second electrode, and causes copper ions or iron ions to dissolve out of the second electrode into the liquid to be treated in the second treatment vessel; and a supply section that supplies the liquid to be treated to the second treatment vessel in a direction that differs from a direction of a jet of the treated liquid ejected from the first treatment vessel.

In the liquid treatment device of the aspect of the present disclosure, generation of copper ions or iron ions, and generation of hydrogen peroxide simultaneously take place in the discharge, and the liquid ejected in the form of a hydrogen peroxide-containing jet is forcibly mixed with a liquid to be treated containing copper ions or iron ions. Here, these liquids are forcibly mixed by introducing the liquid to be treated in a different direction from the swirl direction of the jet of the ejected liquid. In this way, the liquid to be treated can be efficiently treated. That is, OH radicals can efficiently generate in the Fenton's reaction, and the treatment efficiency can improve even when the liquid to be treated has high fluidity.

DESCRIPTION OF EMBODIMENTS

Embodiment

Figure 1:
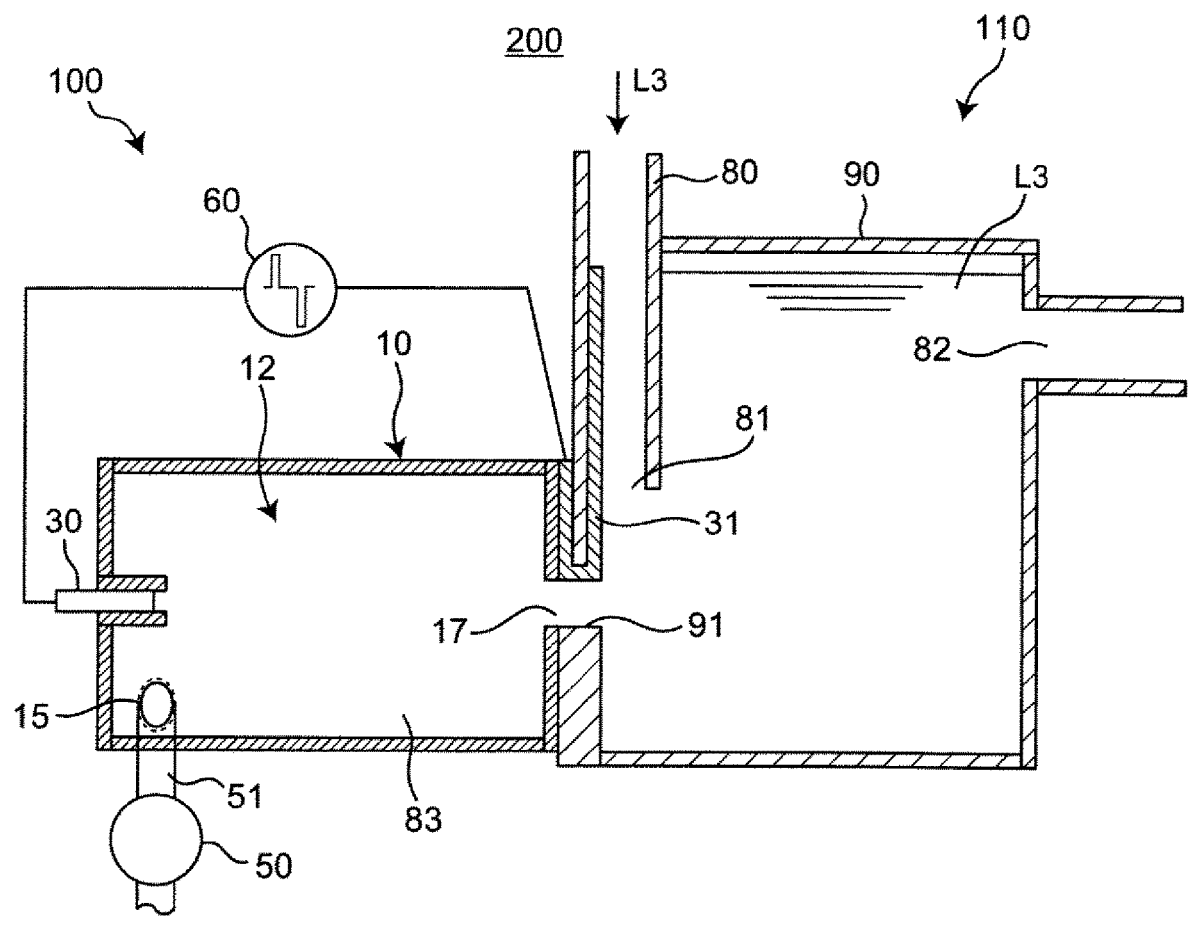
FIG. 1 is a side cross sectional view showing a configuration of a liquid treatment device according to First Embodiment of the present disclosure.
Figure 1:
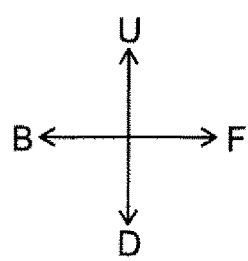

A liquid treatment device 200 according to an embodiment of the present disclosure is described below in detail, with reference to the accompanying drawings. In the drawings, the same or corresponding features are referred to by using the same reference numerals, and the same descriptions will not be repeated. To help understand the descriptions, the configurations in the drawings referred to in the following descriptions may be shown in simplified or schematic forms, or with omission of some of the constituting members. The dimensional ratios of the constituting members shown in the drawings are not necessarily true to the actual dimensional ratios.

Overall Configuration

The overall configuration of the liquid treatment device 200 is described first.

FIG. 1 is a side cross sectional view showing a configuration of the liquid treatment device 200 according to First Embodiment of the present disclosure. In the diagrams referred to below, the arrow F represents the front of the liquid treatment device 200, and arrow B represents the back of the liquid treatment device 200. Arrow U represents the top of the liquid treatment device 200, and arrow D represents the bottom of the liquid treatment device 200. Arrow R represents the right as viewed from the back, and arrow L represent the left as viewed from the back.

The liquid treatment device 200 shown in FIG. 1 is configured from a discharge treatment unit 100 and a liquid mixing unit 110. The discharge treatment unit 100 causes a plasma discharge in the liquid inside a first treatment vessel 12, and adds active species to the liquid. The present embodiment will be described through the case of treating an aqueous solution containing contaminants. The liquid mixing unit 110 has a second treatment vessel 90 in which a treated liquid L2 containing active species after the treatment in the first treatment vessel 12 of the discharge treatment unit 100 is stored by being ejected in the form of a jet.

The discharge treatment unit 100 includes at least a discharge treatment unit main body 10, and a pulse power supply 60. The discharge treatment unit 100 may also include a liquid supply section 50 connected to an inlet portion 15 (described below).

The discharge treatment unit main body 10 includes the first treatment vessel 12, the inlet portion 15 serving as an example of a liquid inlet, a liquid ejecting section 17, a first electrode 30, and a second electrode 31.

The first treatment vessel 12 is where the introduced liquid (for example, water) L1 is treated. The first treatment vessel 12 has a cylindrical treatment chamber having a circular front cross section. The inlet portion 15 is disposed at one end of the first treatment vessel 12, and the liquid ejecting section 17 is disposed at the other end of the first treatment vessel 12. The material of the first treatment vessel 12 may be an insulator or a conductor. In the case of a conductor, the first treatment vessel 12 must be separated from the electrodes 30 and 31 via an insulator.

The liquid L1 is introduced into the first treatment vessel 12 through the inlet portion 15. The inlet portion 15 is in communication with the liquid supply section 50 via a pipe 51.

The treated liquid L2 treated in the first treatment vessel 12 is ejected from the first treatment vessel 12 through the liquid ejecting section 17. In the present embodiment, the liquid ejecting section 17 is connected to an intake opening 91 of the second treatment vessel 90. The treated liquid L2 ejected through the liquid ejecting section 17 enters the second treatment vessel 90 of the liquid mixing unit 110 in the form of a swirling flow of ejected liquid F2 through the intake opening 91, and is stored in the second treatment vessel 90.

The liquid mixing unit 110 is configured from the second treatment vessel 90 and a supply section 80.

The second treatment vessel 90 is disposed adjacent the first treatment vessel 12, and the liquid ejecting section 17 of the first treatment vessel 12 is connected to the intake opening 91 of the second treatment vessel 90. The treated liquid L2 ejected through the liquid ejecting section 17 of the first treatment vessel 12 enters the second treatment vessel 90 through the intake opening 91, and is stored in the second treatment vessel 90. The liquid to be treated L3 in the second treatment vessel 90 is then treated with the treated liquid L2. The supply section 80 is disposed at an end portion of the second treatment vessel 90 on the side of the first treatment vessel 12. The material of the second treatment vessel 90 may be an insulator or a conductor. In the case of a conductor, the second treatment vessel 90 must be separated from the second electrode 31 via an insulator.

The supply section 80 is configured as a supply pipe disposed along the wall at an end portion of the second treatment vessel 90 adjacent the first treatment vessel 12. Through the supply section 80, the liquid to be treated L3 is introduced into the second treatment vessel 90, for example, into a region near the liquid ejecting section 17, through a supply opening 81 at an end of the supply pipe. The liquid to be treated L3 is introduced into the second treatment vessel 90 from the supply section 80 in a direction different from the direction the treated liquid L2 is ejected into the second treatment vessel 90 from the first treatment vessel 12 through the liquid ejecting section 17 and the intake opening 91. Specifically, the liquid to be treated L3 and the treated liquid L2 cross, and efficiently mix together. The material of the supply section 80 may be an insulator or a conductor. In the case of a conductor, the supply section 80 must be separated from the second electrode 31 via an insulator.

The first electrode 30 is rod-like in shape, and is disposed in the first treatment vessel 12. The first electrode 30 is disposed via, for example, an insulating section on the wall surface opposite the wall surface where the liquid ejecting section 17 of the first treatment vessel 12 is formed.

The second electrode 31 is configured as a plate-like member formed of a copper- or iron-containing metal. As an example, the second electrode 31 is disposed so that, as shown in FIG. 1, one end of the second electrode 31 is on the outer side of the wall of the first treatment vessel 12 where the liquid ejecting section 17 is formed, specifically, on the wall surface of the second treatment vessel 90 adjacent the first treatment vessel 12 where the first treatment vessel 12 and the second treatment vessel 90 join together. The other end of the second electrode 31 is on the inner wall surface of the supply section 80 through and around the intake opening 91. This arrangement of the second electrode 31 is merely an example, and the second electrode 31 may be disposed any other way, provided that it is at least disposed at one end of a central axis X1 of the first treatment vessel 12. Here, the one end of the central axis X1 is not limited to the wall surface at one end of the first treatment vessel 12, and may be in the vicinity of the region where the first treatment vessel 12 and the second treatment vessel 90 join together, outside of the first treatment vessel 12, or may be in the vicinity of the region where the first treatment vessel 12 and the second treatment vessel 90 join together, inside the second treatment vessel 90. This will be described later as variations of the embodiment.

The pulse power supply 60 is connected to the first electrode 30 and the second electrode 31, and applies a high pulse-voltage with the second electrode 31 serving as an anode. That is, a positive voltage is applied to the second electrode 31.

The liquid supply section 50 is, for example, a pump that supplies a liquid (for example, water) L1 into the first treatment vessel 12. The liquid supply section 50 is connected to the pipe 51. At one end, the pipe 51 is connected to the inlet portion 15. The other end of the pipe 51 is connected to a liquid source (for example, a water tank or a faucet; not illustrated). Alternatively, the other end of the pipe 51 is connected to the second treatment vessel 90 so as to circulate a liquid (liquid to be treated L3) containing the treated liquid L2 sent from the first treatment vessel 12 and stored in the second treatment vessel 90.

The pulse power supply 60 applies a bipolar high pulse-voltage of several kilovolts between the first electrode 30 and the second electrode 31, with the second electrode 31 serving as an anode.

Device Main Body

Figure 2:
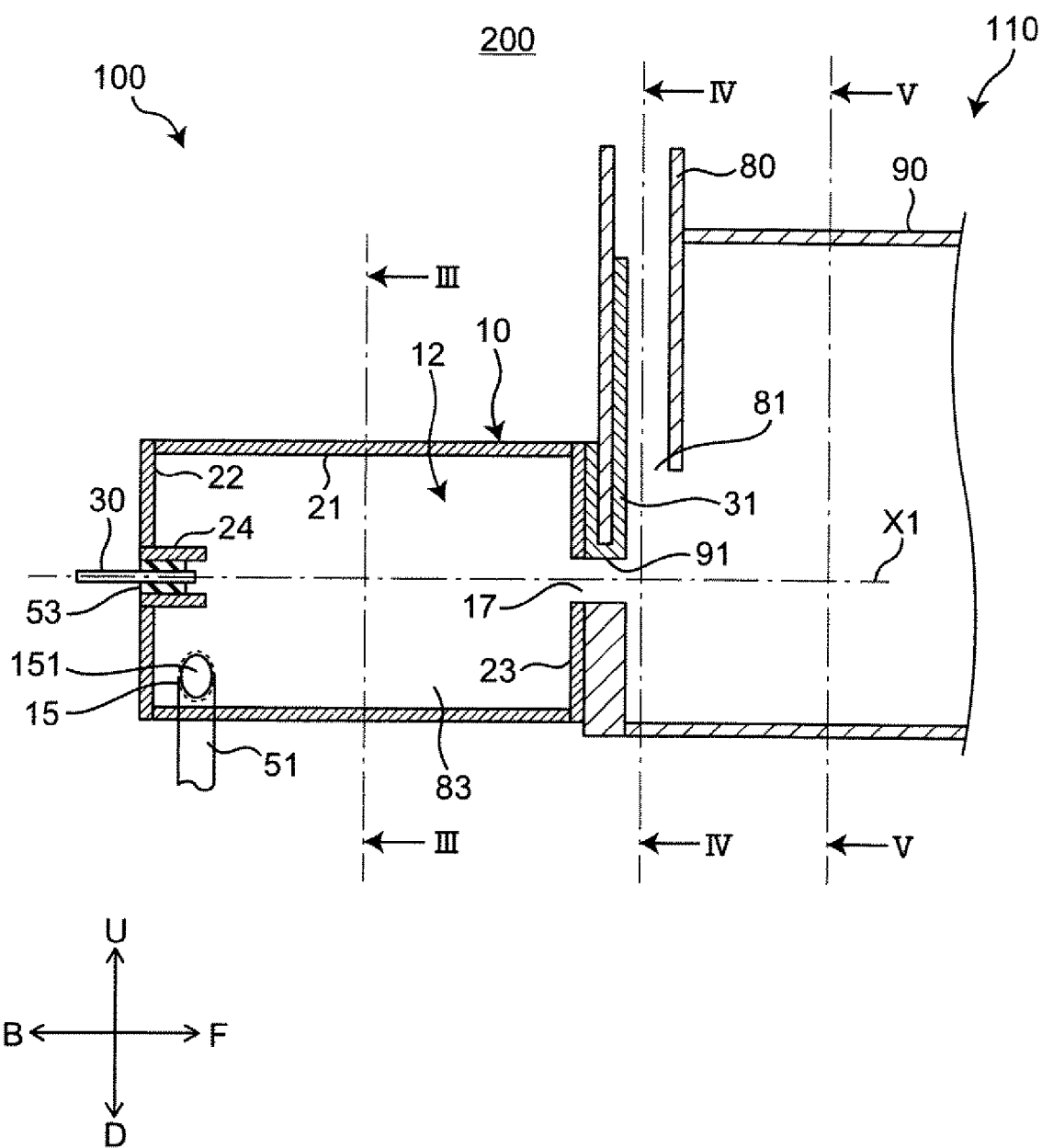
FIG. 2 is a side cross sectional view of a device main body.

The discharge treatment unit main body 10 is described below in detail. FIG. 2 is a side cross sectional view of the discharge treatment unit main body 10.

The first treatment vessel 12 has a first inner wall 21, a second inner wall 22, and a third inner wall 23. The first inner wall 21 is a cylindrical wall portion. The second inner wall 22 is provided at a first end portion of the first inner wall 21 (for example, the left end portion of FIG. 2). The third inner wall 23 is provided at a second end portion of the first inner wall 21 (for example, the right end portion of FIG. 2). The second inner wall 22 and the third inner wall 23 are substantially circular in shape as viewed from side. The first inner wall 21, the second inner wall 22, and the third inner wall 23 form a substantially cylindrical housing 83 inside the first treatment vessel 12. Here, the first inner wall 21 has a central axis X1, that is, an imaginary central axis of the substantially cylindrical housing 83 formed inside the first treatment vessel 12.

The second inner wall 22 has an electrode supporting tube 24 projecting out into the first treatment vessel 12 from the center of the second inner wall 22. The electrode supporting tube 24 is tubular in shape, and extends toward the third inner wall 23 (i.e., toward the right in FIG. 2). The electrode supporting tube 24 is disposed in such an orientation that its central axis lies on the central axis X1. The first electrode 30 is supported in the electrode supporting tube 24, via an insulator 53. The first electrode 30, which is rod-like in shape, is surrounded by the insulator 53 having a form of a tube. Accordingly, the first electrode 30 is in such an orientation that its longitudinal axis lies on the central axis X1. The inner end portion of the first electrode 30 projects out toward the third inner wall 23 (i.e., toward the right in FIG. 2) by about the same length as the electrode supporting tube 24, past the insulator 53.

Figure 3:
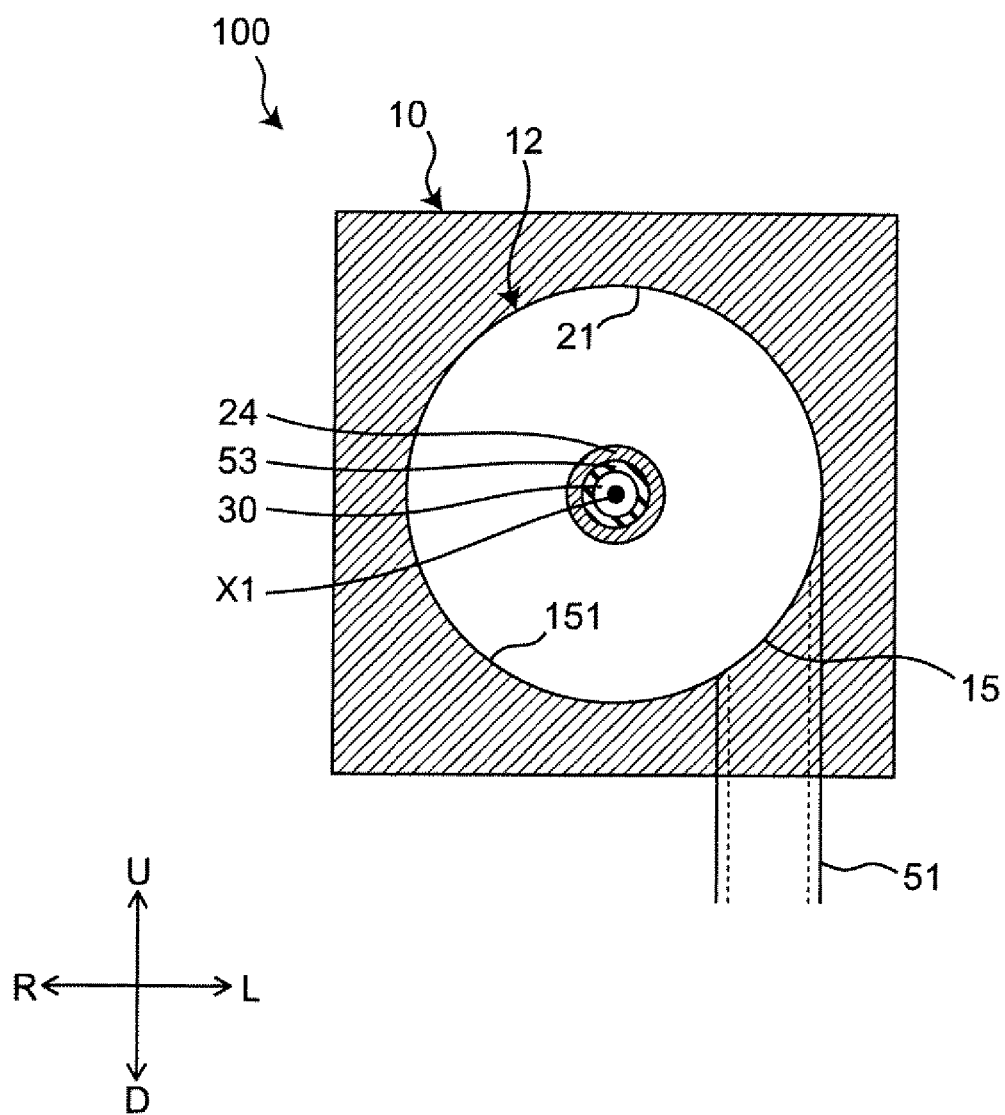
FIG. 3 is a cross sectional view at line III-III of FIG. 2.

The inlet portion 15 is provided through the discharge treatment unit main body 10, and has an open end 151 formed in the first inner wall 21. The inlet portion 15 is disposed at a location adjacent the second inner wall 22 as viewed from side. FIG. 3 is a cross sectional view at line III-III of FIG. 2. The inlet portion 15 is disposed in the wall surface of the first inner wall 21.

The liquid ejecting section 17 is provided through, for example, a central portion of the third inner wall 23. The liquid ejecting section 17 is formed in such a fashion that its central axis lies on the central axis X1. The liquid ejecting section 17 is connected to the intake opening 91 of the second treatment vessel 90.

Figure 4:
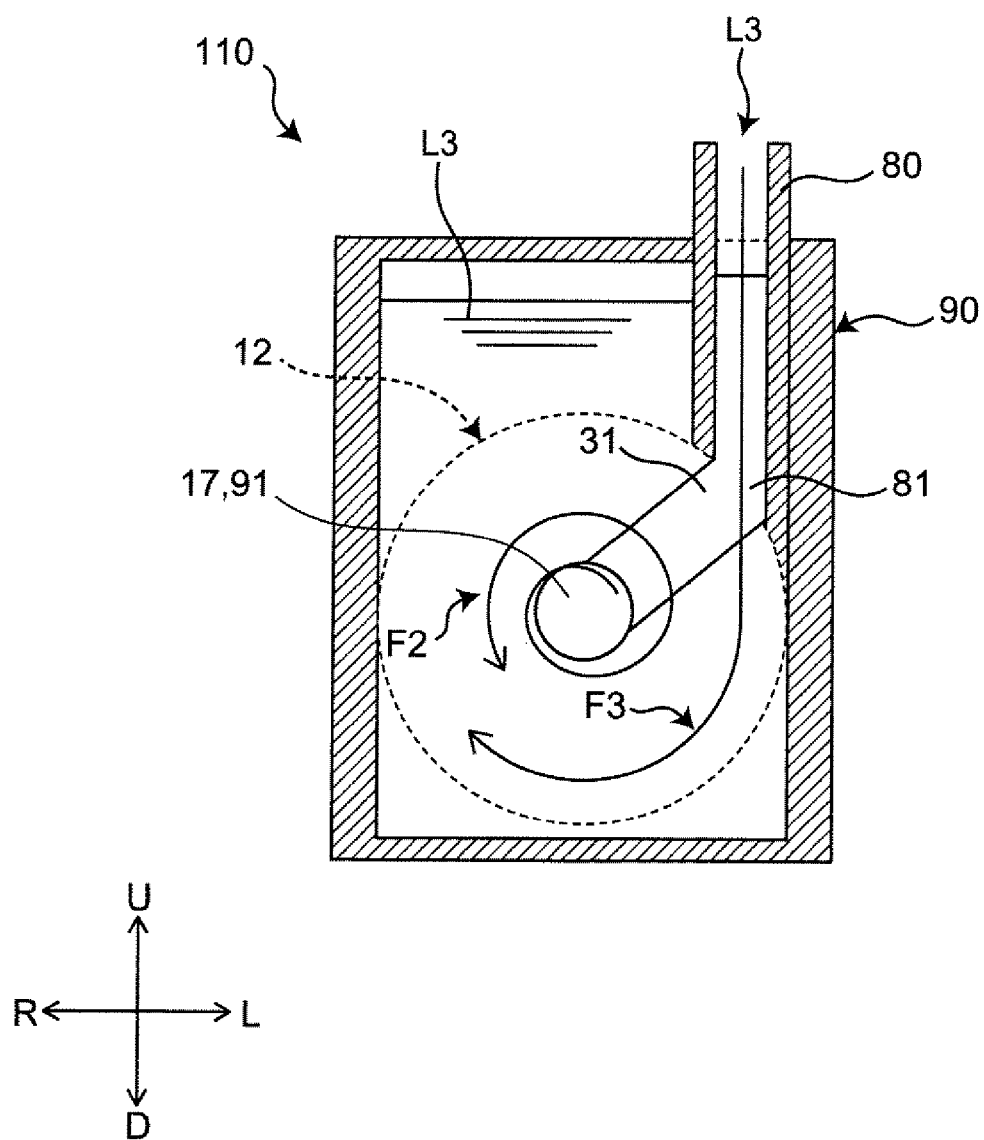
FIG. 4 is a cross sectional view at line IV-IV of FIG. 2.

The second electrode 31 is a copper- or iron-containing plate-like metallic member. The second electrode 31 is disposed in such an orientation that it reaches into the supply section 80 through the supply opening 81 around the liquid ejecting section 17 of the first treatment vessel 12, as shown in FIG. 4, which shows a cross sectional view at line IV-IV of FIG. 2.

Operation

The operation of the liquid treatment device 200 is described below.

Figure 6:
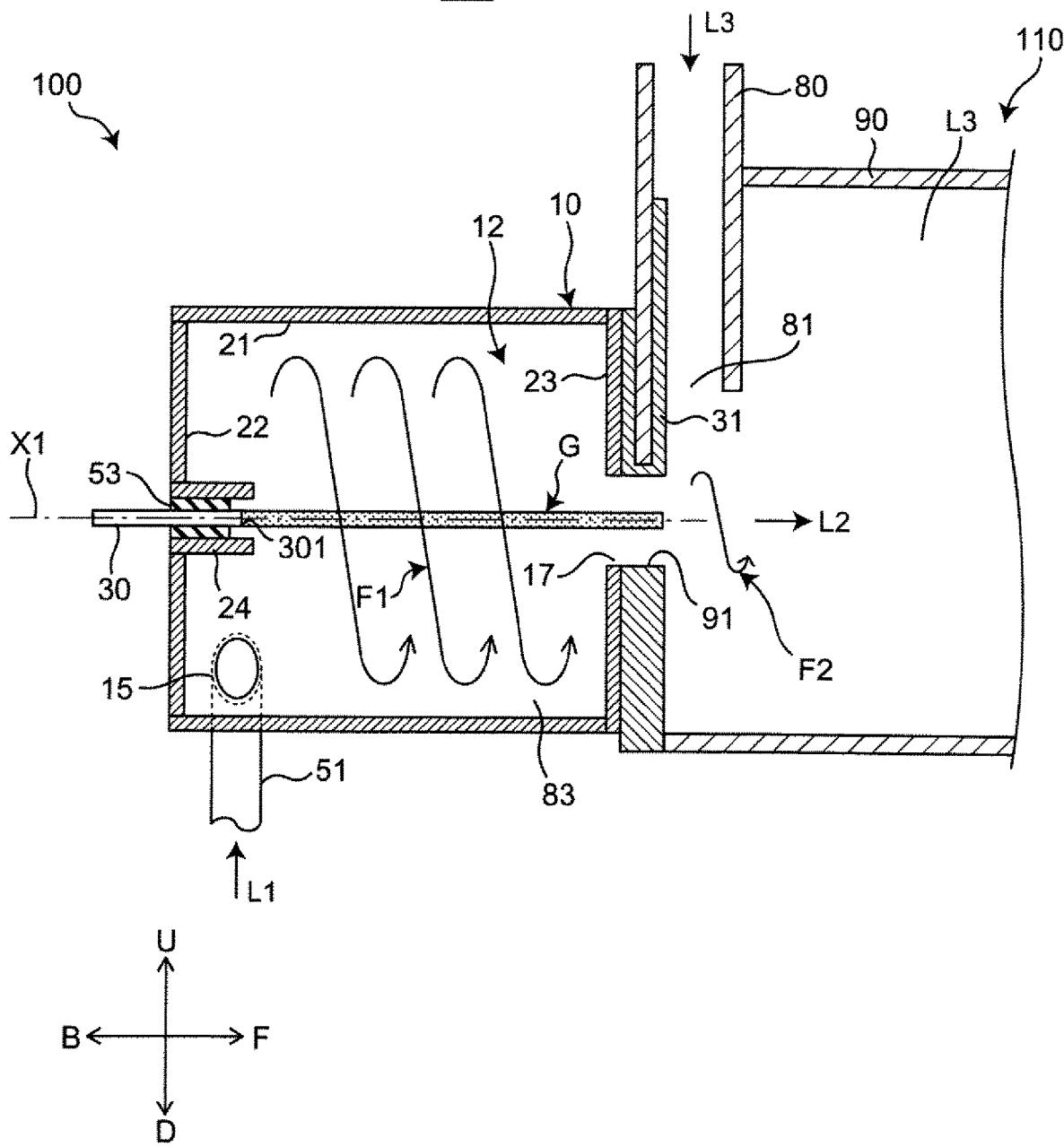
FIG. 6 is a side cross sectional view showing a swirl flow that has generated in a first treatment vessel, in the absence of an applied voltage.
Figure 7:
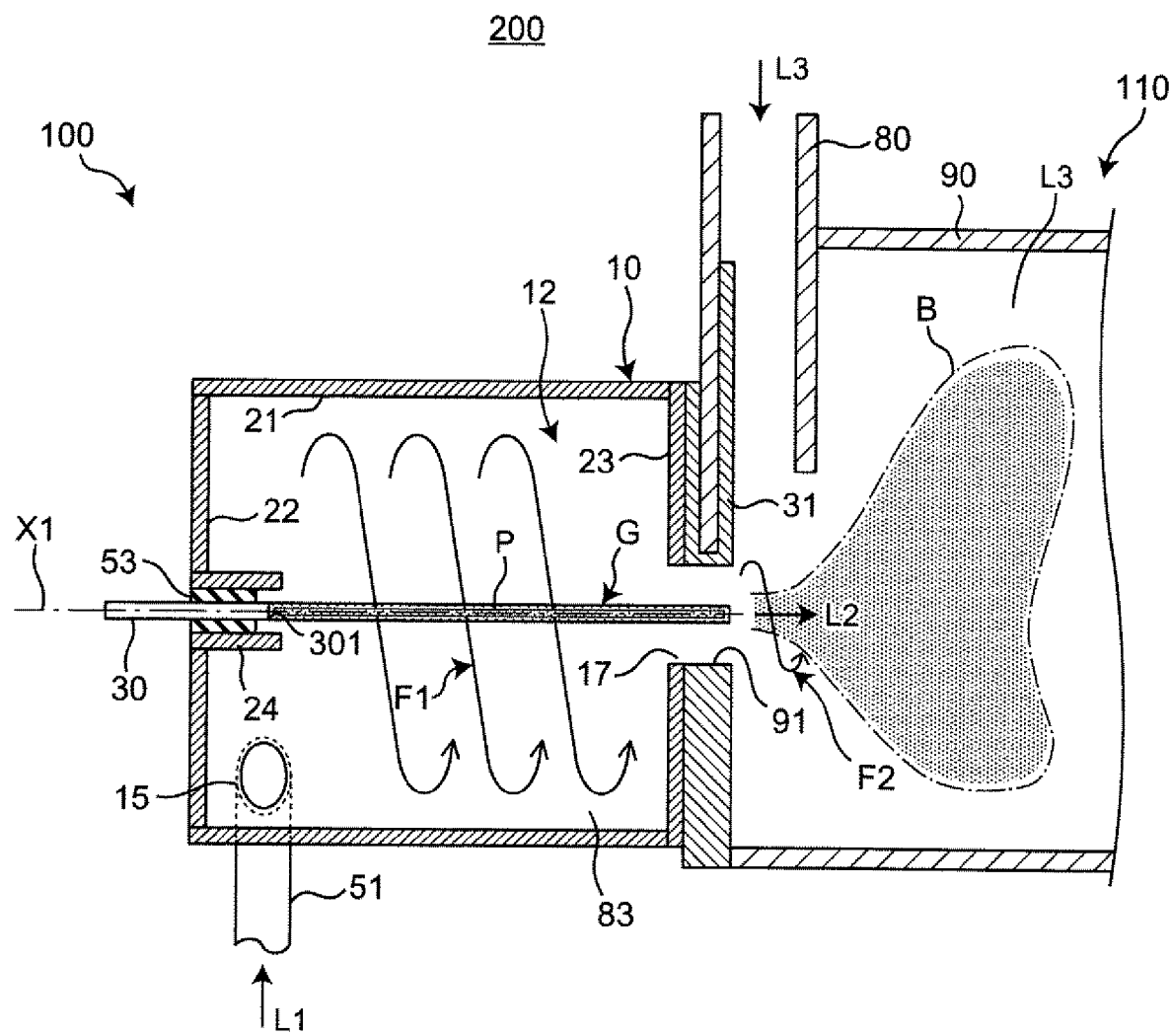
FIG. 7 is a side cross sectional view showing a swirl flow that has generated in the first treatment vessel, in the presence of an applied voltage.
Figure 7:
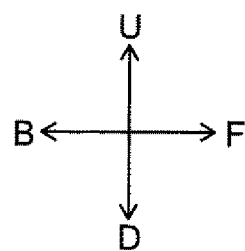

For the purpose of explanation, the operation of the liquid treatment device 200 will be described for a state in which a gas phase G is generated in the first treatment vessel 12 (FIG. 6), and a state in which a plasma P is generated by applying a pulse voltage to the gas phase G from the pulse power supply 60 (FIG. 7). FIG. 6 is a side cross sectional view showing a swirl flow F1 that has generated inside the first treatment vessel 12, in the absence of an applied pulse voltage.

As shown in FIG. 6, a liquid (for example, water) L1 is introduced into the first treatment vessel 12 through the inlet portion 15 under a predetermined pressure, specifically, under the pressure of a pump, or under the pressure of running water in the case of using tap water instead of a pump. In response, the liquid L1 moves toward the right-hand side of FIG. 6 from the inlet portion 15 as it generates a swirl flow F1 along the first inner wall 21. The swirl flow F1 traveling rightward in FIG. 6 is directed toward the liquid ejecting section 17.

By the presence of the swirl flow F1, the pressure around the central axis X1 drops below the saturated water vapor pressure, and the liquid L1 partially vaporizes, and generates a gas phase G in the vicinity of the central axis X1. The gas phase G occurs around the swirl axis, specifically, on and along the central axis X1 from the right end portion 301 of the first electrode 30 of FIG. 6 to regions near the intake opening 91. The gas phase G is in contact with the swirl flow F1, and swirls with the swirl flow F1 in the same direction. In the vicinity of the liquid ejecting section 17 and the intake opening 91, the swirling gas phase G experiences resistance from the treated liquid L2 present in the second treatment vessel 90, and is sheared into microbubbles or nanobubbles. These bubbles diffuse into the second treatment vessel 90 as soon as the treated liquid L2 containing large quantities of bubbles is ejected into the second treatment vessel 90 through the liquid ejecting section 17, and through the intake opening 91 connected to the liquid ejecting section 17.

FIG. 7 is a side cross sectional view showing a state in which the pulse power supply 60 has applied a pulse voltage between the first electrode 30 and the second electrode 31 in the presence of the swirl flow F1 generated inside the first treatment vessel 12 as shown in FIG. 6. As shown in FIG. 7, the pulse power supply 60 applies a high pulse-voltage between the first electrode 30 and the second electrode 31 with the gas phase G being present over the region from the first electrode 30 to the intake opening 91 after the vaporization of the liquid L1. Applying a high pulse-voltage between the first electrode 30 and the second electrode 31 generates a plasma P in the gas phase G, and this produces radicals (e.g., OH radicals) or ions. The radicals or ions dissolve into the swirl flow F1 from the gas phase G, and decompose the contaminants dissolving in the liquid L1. The plasma P in the gas phase G near the liquid ejecting section 17 experiences resistance from the treated liquid L2 present in the second treatment vessel 90, and this produces a large quantity of bubbles B containing active species such as OH radicals and ions. The liquid L2 is ejected into the second treatment vessel 90 through the liquid ejecting section 17 with the bubbles B or active species. That is, the OH radicals and other chemical species generated by plasma P dissolve into the treated liquid L2 stored in the second treatment vessel 90, either directly or through bubbles B. After a lapse of a predetermined time period, the treated liquid L2 in the second treatment vessel 90 turns into relatively stable hydrogen peroxide. The plasma P generated in response to high pulse-voltage application becomes extinguished upon ending voltage application.

The plasma generates ultraviolet (UV) light as it discharges. The generated UV light can decompose and sterilize contaminants or microorganisms upon falling on these substances. The UV light also generates OH radicals upon falling on the hydrogen peroxide water generated in the treated liquid, and the contaminants and microorganisms can be decomposed and sterilized also by these OH radicals.

Because the second electrode 31 is made of copper- or iron-containing metal, applying a positive voltage to the second electrode 31 causes an electrolysis in the voltage application by the pulse power supply 60, and metal ions dissolve out of the second electrode 31 in the supply section 80 into the liquid to be treated L3 passing through the supply section 80. The liquid to be treated L3 containing the metal ions leaves the supply opening 81, and is introduced into the second treatment vessel 90 in the form of a directional liquid flow (for example, clockwise in FIG. 4), as shown in the supply liquid flow F3 in FIG. 4. The supply liquid flow F3 of the liquid to be treated L3 is introduced into the second treatment vessel 90 in such a manner that the liquid L3 forms a liquid flow of a direction different from the swirl direction of the ejected liquid flow F2 (counter clockwise in FIG. 4) that occurs in the vicinity of the liquid ejecting section 17 when the treated liquid L2 containing active species is ejected from the liquid ejecting section 17.

Figure 5:
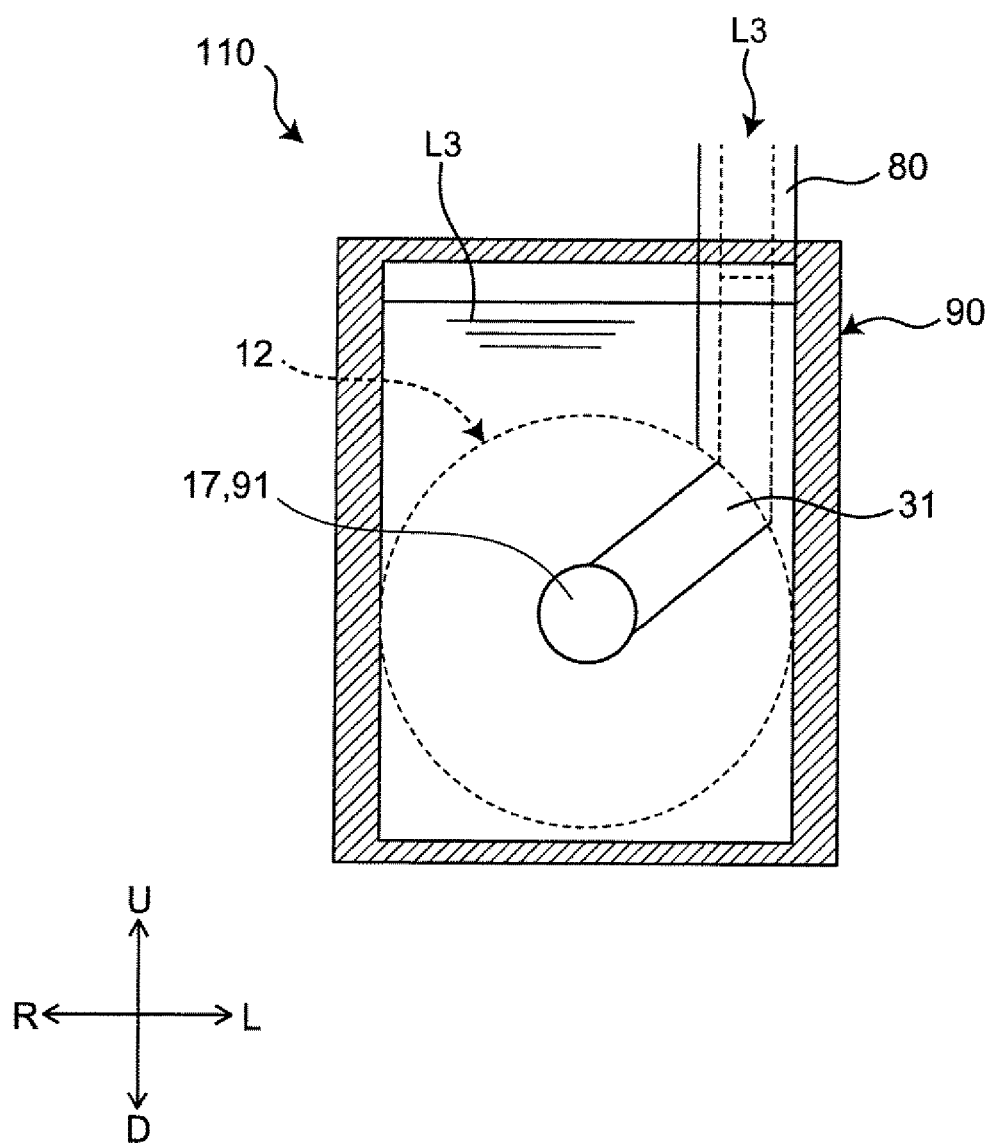
FIG. 5 is a cross sectional view at line V-V of FIG. 2.

In this way, the ejected liquid flow F2 of the treated liquid L2 containing active species ejected from the first treatment vessel 12 opposes the supply liquid flow F3 of the copper or iron metal ion-containing liquid to be treated L3 in the second treatment vessel 90. That is, the ejected liquid flow F2 and the supply liquid flow F3 become forcibly mixed as they rotate in different directions (for example, opposite directions) and collide with each other, making it possible to more efficiently treat the liquid to be treated L3. The active species-containing treated liquid L2, and the copper or iron metal ion-containing liquid to be treated L3 mix even more efficiently in the second treatment vessel 90 as the microbubbles or nanobubbles contained in the active species-containing treated liquid L2 rise and diffuse in the liquid, and the Fenton's reaction takes place more efficiently. The OH radicals generated by the Fenton's reaction can then react with the organic materials and other substances contained in the liquid to be treated L3, and effectively decompose these substances. The second treatment vessel 90 has a larger inner space than the first treatment vessel 12 (for example, the second treatment vessel 90 is higher than the first treatment vessel 12) in the vicinity of the line V-V of FIG. 2 (the cross section is shown in FIG. 5) where the supply liquid flow F3 and the ejected liquid flow F2 that generates in the vicinity of the liquid ejecting section 17 do not mix as effectively as in regions near the liquid ejecting section 17, so that the treated liquid L2 and the liquid to be treated L3 can be continuously mix as a result of the microbubbles or nanobubbles rising and diffusing in the liquid to be treated L3.

In the embodiment described above, generation of copper ions or iron ions from the second electrode 31, and generation of hydrogen peroxide in the first treatment vessel 12 simultaneously take place in the discharge, and the treated liquid L2 ejected in the form of a hydrogen peroxide-containing jet is brought into contact with the liquid to be treated L3 containing copper ions or iron ions. Here, the treated liquid L2 and the liquid to be treated L3 are forcibly mixed by introducing the liquid to be treated L3 in a different direction from the swirl direction of the ejected liquid flow F2, which is a swirling jet of the ejected liquid L2. In this way, the liquid to be treated L3 can be efficiently treated. That is, OH radicals can efficiently generate in the Fenton's reaction, and the treatment efficiency improves even when the liquid to be treated L3 has high fluidity. Because the plasma P is generated by vaporizing liquid L1 in the swirl flow F1, and applying a pulse voltage from the pulse power supply 60 to the generated gas phase G, the efficiency of plasma P generation improves, and the liquid to be treated L3 can be treated in a shorter time period.

Variations

Figure 8:
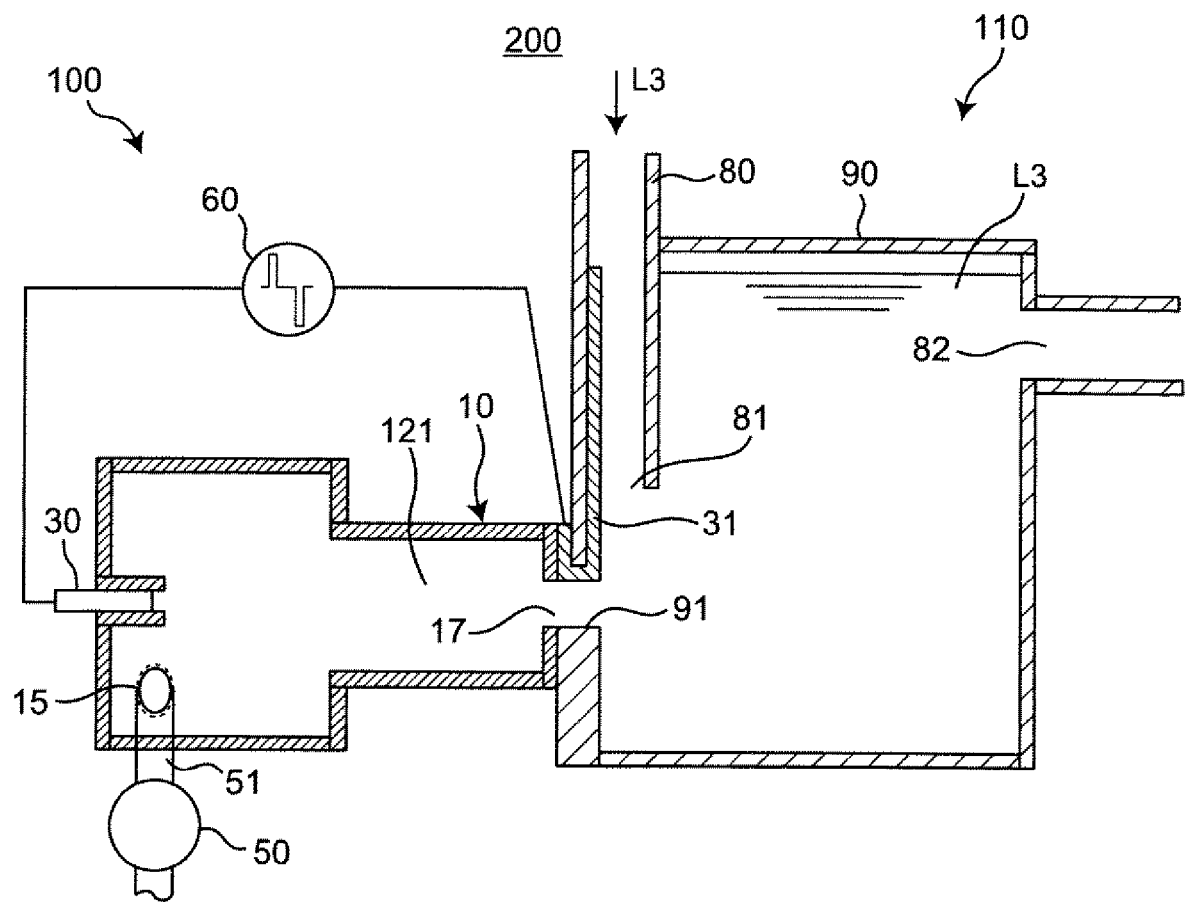
FIG. 8 is a side cross sectional view representing a variation of the device main body.
Figure 9:
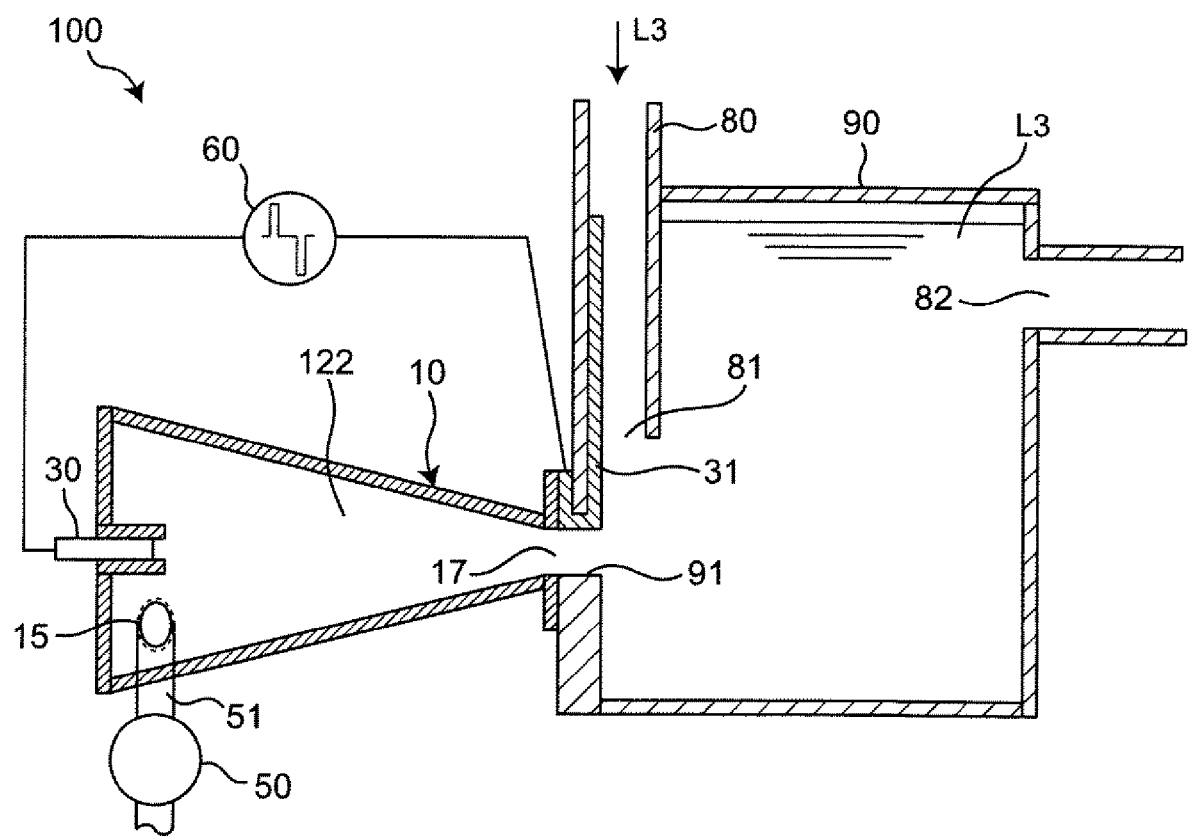
FIG. 9 is a side cross sectional view representing a variation of the device main body.
Figure 9:
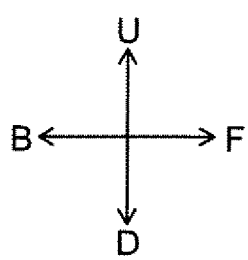

In the foregoing descriptions, the first treatment vessel 12 is described as a vessel of a simple cylindrical shape. However, the first treatment vessel 12 may have a variety of other shapes, provided that it is a cylindrical vessel with a circular cross section and a closed end. For example, the same effect can be obtained with a first treatment vessel 121 that combines cylinders of different radii as shown in FIG. 8, or with a first treatment vessel 122 having a circular cone shape as shown in FIG. 9.

Figure 10:
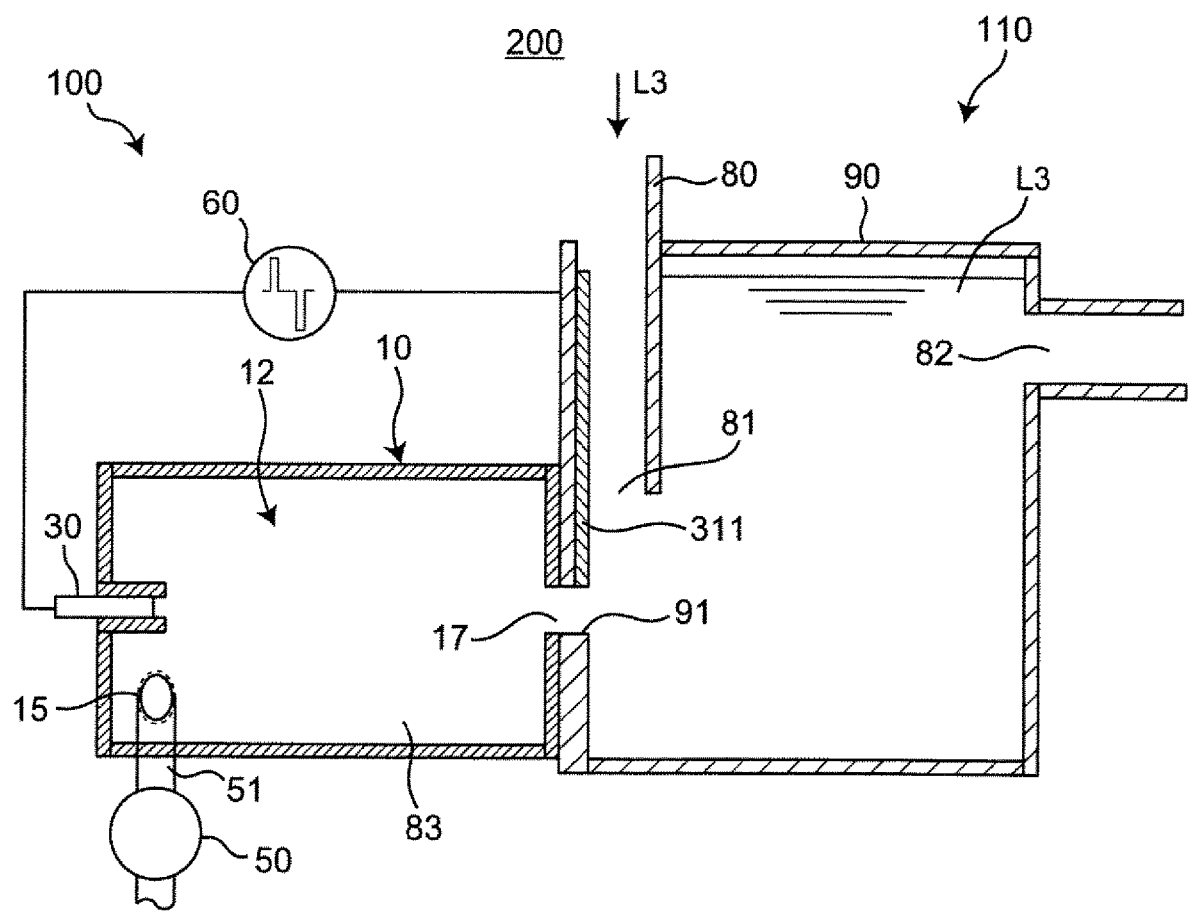
FIG. 10 is a side cross sectional view representing a variation of the device main body.
Figure 10:
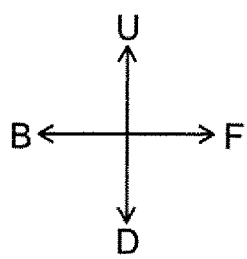

The second electrode 31 was described as being disposed in such a fashion that one end of the second electrode is in a region where the first treatment vessel 12 and the second treatment vessel 90 join together, and the other end of the second electrode 31 extends to the inner wall surface of the supply section 80 through the intake opening 91. However, for example, the second electrode 31 may be disposed in the vicinity of the liquid ejecting section 17 of the first treatment vessel 12, and the intake opening 91. The same effect can be obtained with a second electrode 311 disposed on the side of the second treatment vessel 90 as shown in FIG. 10, which represents another example of the second electrode being disposed at one end of the central axis X1 of the first treatment vessel 12.

In the foregoing embodiment and variation, the supply section 80 is described through the case where the swirl flow of the ejected liquid flow F2 of the active species-containing treated liquid L2 mixes in a reverse direction with the supply liquid flow F3 of the liquid to be treated L3 in the vicinity of the liquid ejecting section 17 and the intake opening 91. However, the present disclosure is not limited to this.

Figure 11A:
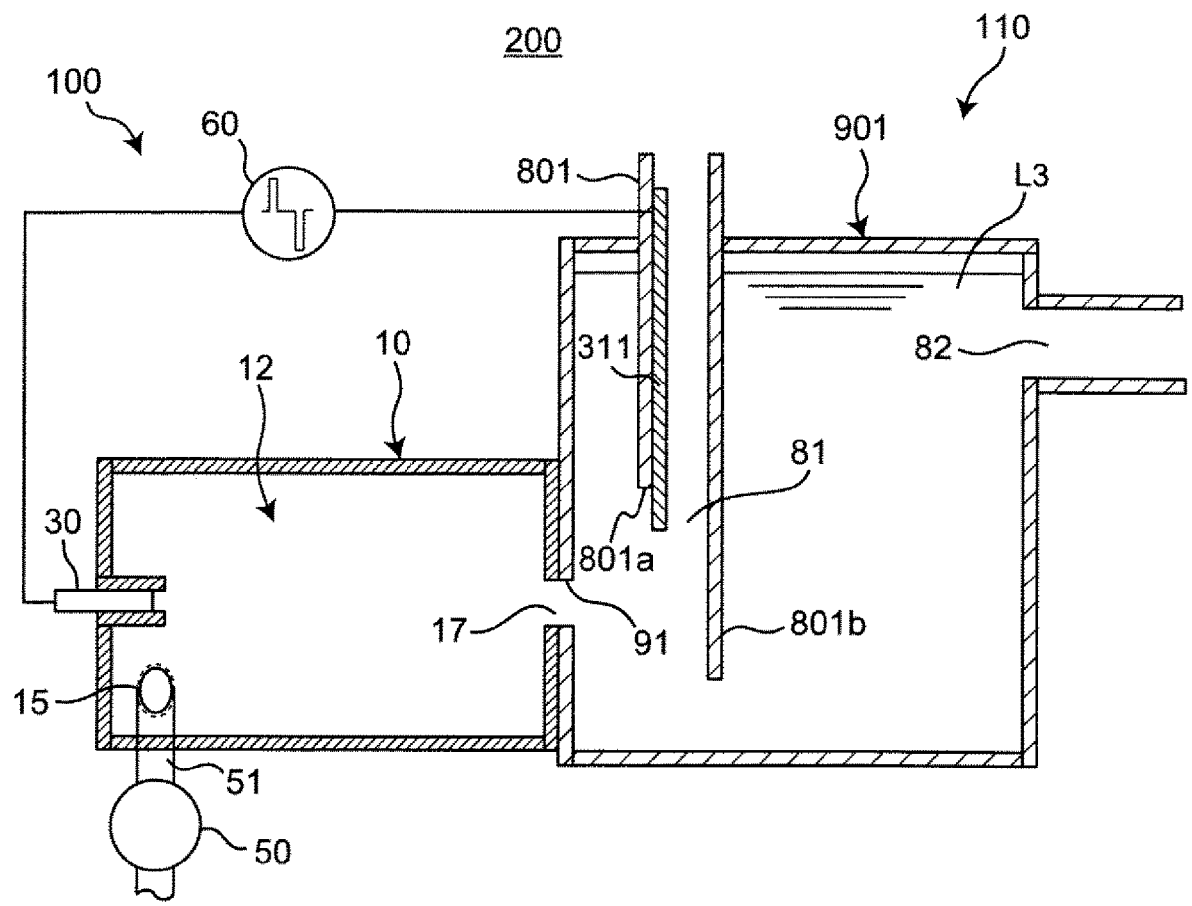
FIG. 11A is a side cross sectional view representing a variation of the device main body.

For example, as another variation of the supply section 80 of the second treatment vessel 90, a supply section 801 may be disposed by being separated from the wall surface of a second treatment vessel 901 adjacent the first treatment vessel 12 as shown in FIG. 11A, which represents another example of the supply section 80 of the second treatment vessel 90 being provided at one end of the central axis X1 of the first treatment vessel 12. The liquid to be treated L3 can then be introduced from above the jet of the ejected liquid flow F2 from the first treatment vessel 12 traveling toward the right-hand side of FIG. 11A, at a right angle to the direction of rotation of the ejected liquid flow F2 in the jet. The effects described in the embodiment also can be obtained with this configuration.

More specifically, the supply section 801 is missing a large portion of its wall at the bottom (bottom wall 801a) on the side of the liquid ejecting section 17 of the first treatment vessel 12, and a bottom wall 801b opposite the liquid ejecting section 17 of the first treatment vessel 12 extends so as to block the imaginary line extending from the liquid ejecting section 17.

With this configuration, the liquid to be treated L3 supplied to the second treatment vessel 901 through the supply section 801 collides and mixes with the treated liquid L2 ejected toward the bottom wall 801b of the second treatment vessel 901 through the liquid ejecting section 17, instead of simply traveling down to the bottom of the second treatment vessel 901 along the axial direction of the supply section 801. Here, the collision occurs in the vicinity of the bottom wall 801b as the liquid to be treated L3 meets the treated liquid L2 from above at a right angle to the direction of rotation of the ejected liquid flow F2.

Figure 11B:
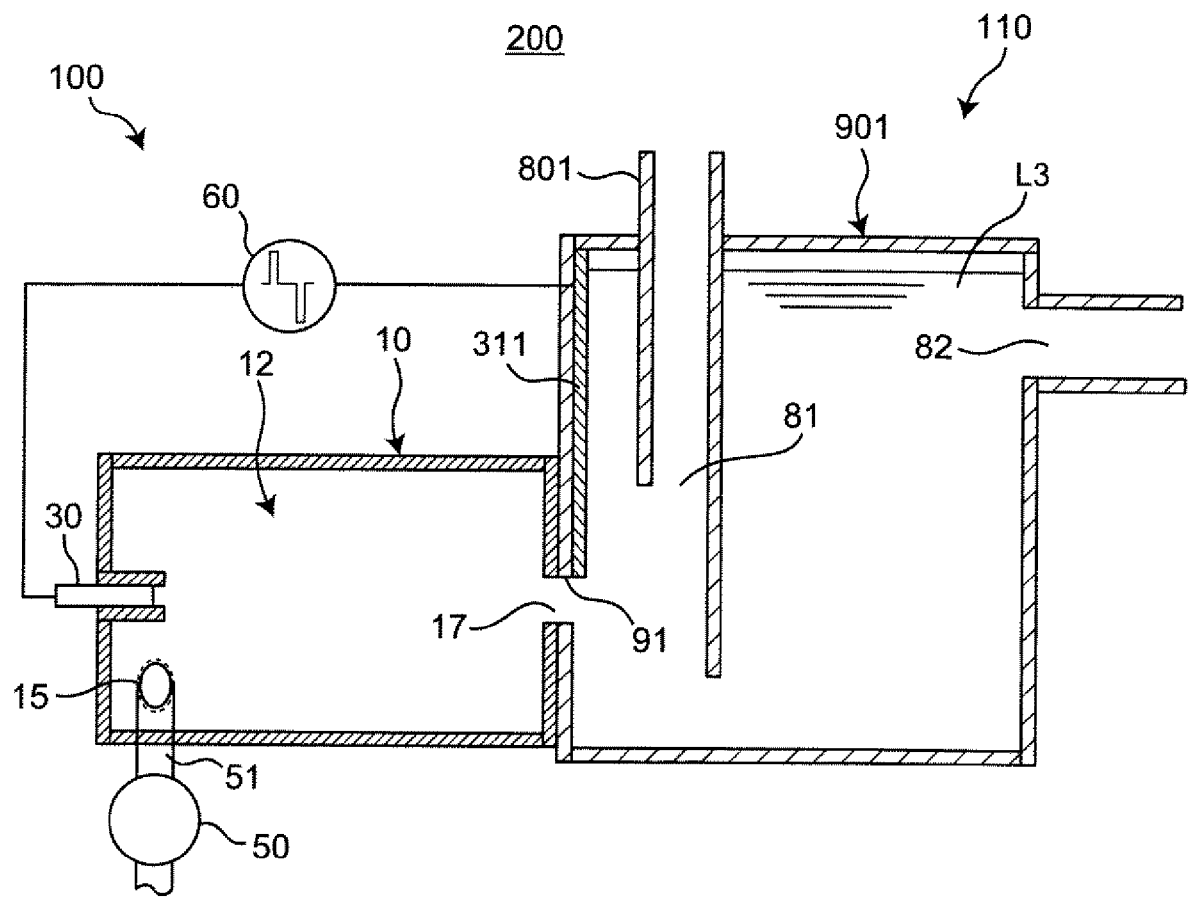
FIG. 11B is a side cross sectional view representing a variation of the device main body.
Figure 11B:
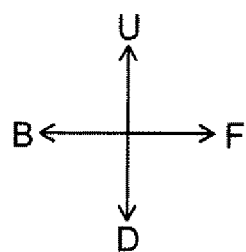

The second electrode 31 is not limited to one disposed in the supply section 801 as in the foregoing embodiment and in FIG. 11A. As shown in FIG. 11B, the second electrode 311, which corresponds to the second electrode 31, may be disposed outside of the supply section 801. For example, the second electrode 311 may be disposed on the wall surface of the second treatment vessel 901 adjacent the first treatment vessel 12, separately from the supply section 801. In FIG. 11B, the second electrode 311 is disposed outside of the supply section 801, instead of inside, and the supply section 801 is disposed in the vicinity of the wall surface of the second treatment vessel 901 adjacent the first treatment vessel 12.

In such a variation, the treated liquid L2 enters the second treatment vessel 901 through the liquid ejecting section 17, and the Fenton's reaction occurs as the treated liquid L2 mixes with the liquid to be treated L3 in the presence of metal ions dissolved out of the second electrode 311 in the second treatment vessel 901.

Figure 11C:
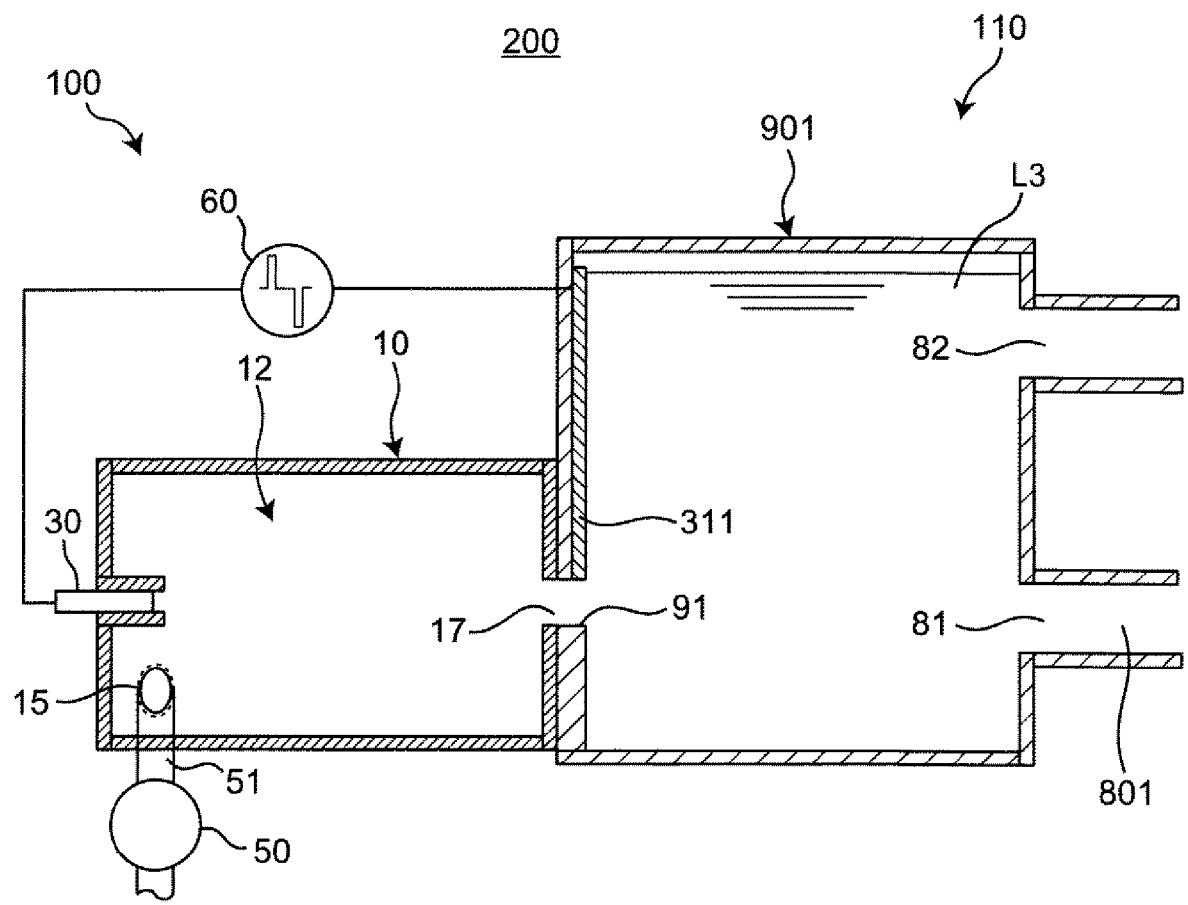
FIG. 11C is a side cross sectional view representing a variation of the device main body.
Figure 11C:
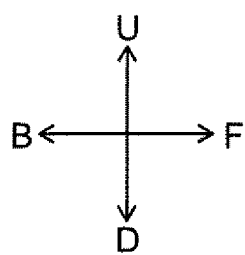

The supply section 801 may be disposed in such an orientation that a supply opening 81 faces the liquid ejecting section 17 and the intake opening 91 in the second treatment vessel 901, as shown in FIG. 11C. In such a configuration, the treated liquid L2 enters the second treatment vessel 90 through the liquid ejecting section 17, and the Fenton's reaction occurs as the treated liquid L2 mixes with the liquid to be treated L3 in the presence of metal ions dissolved out of the second electrode 311 in the second treatment vessel 901. In this configuration, the liquid to be treated L3 is supplied into the second treatment vessel 901 through the supply section 801 in a direction that crosses (or is orthogonal to) the jet direction of the treated liquid L2 ejected from the first treatment vessel 12, that is, the swirl direction of the ejected liquid flow F2.

Figure 12:
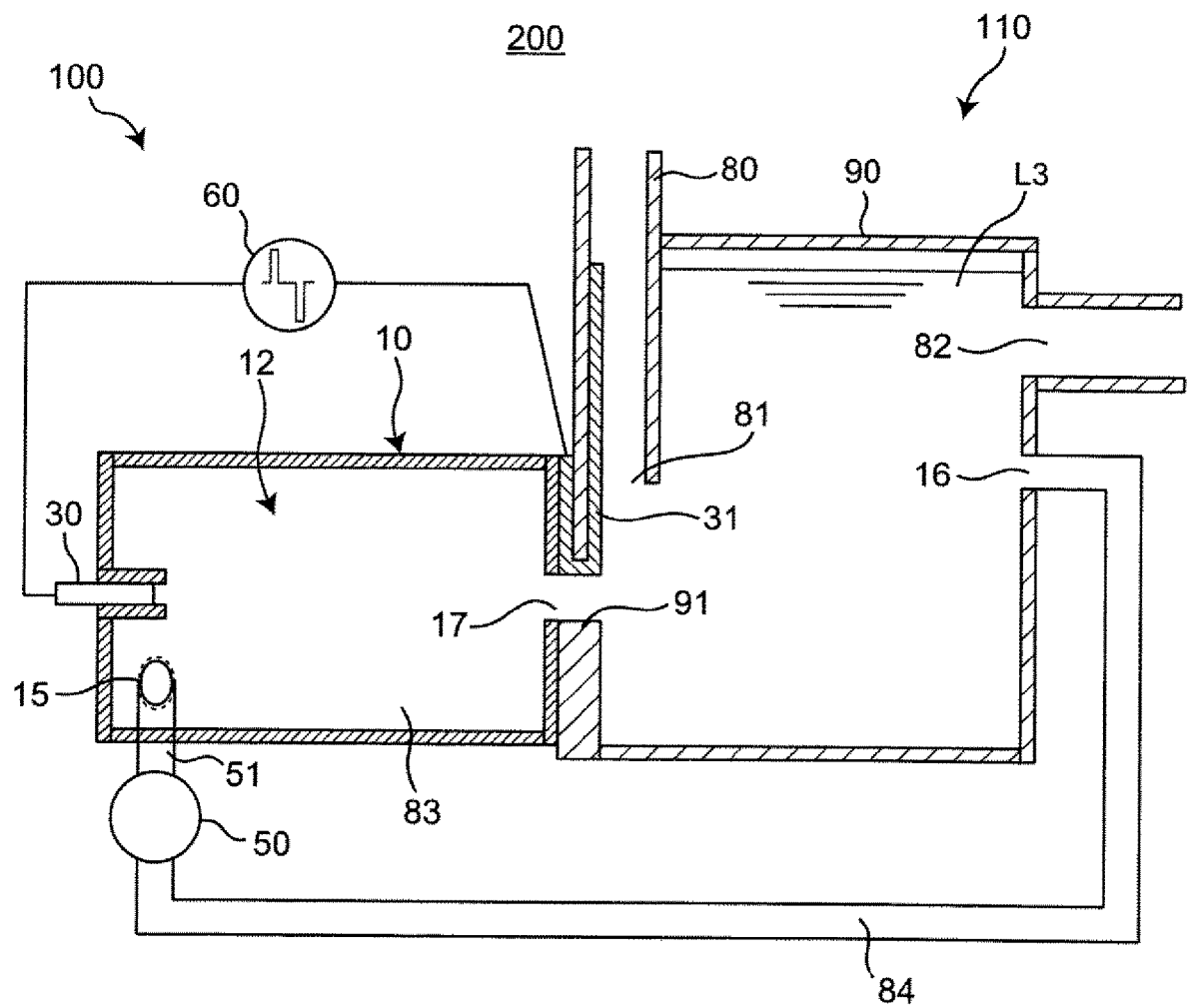
FIG. 12 is a side cross sectional view representing a variation of the device main body.
Figure 13:
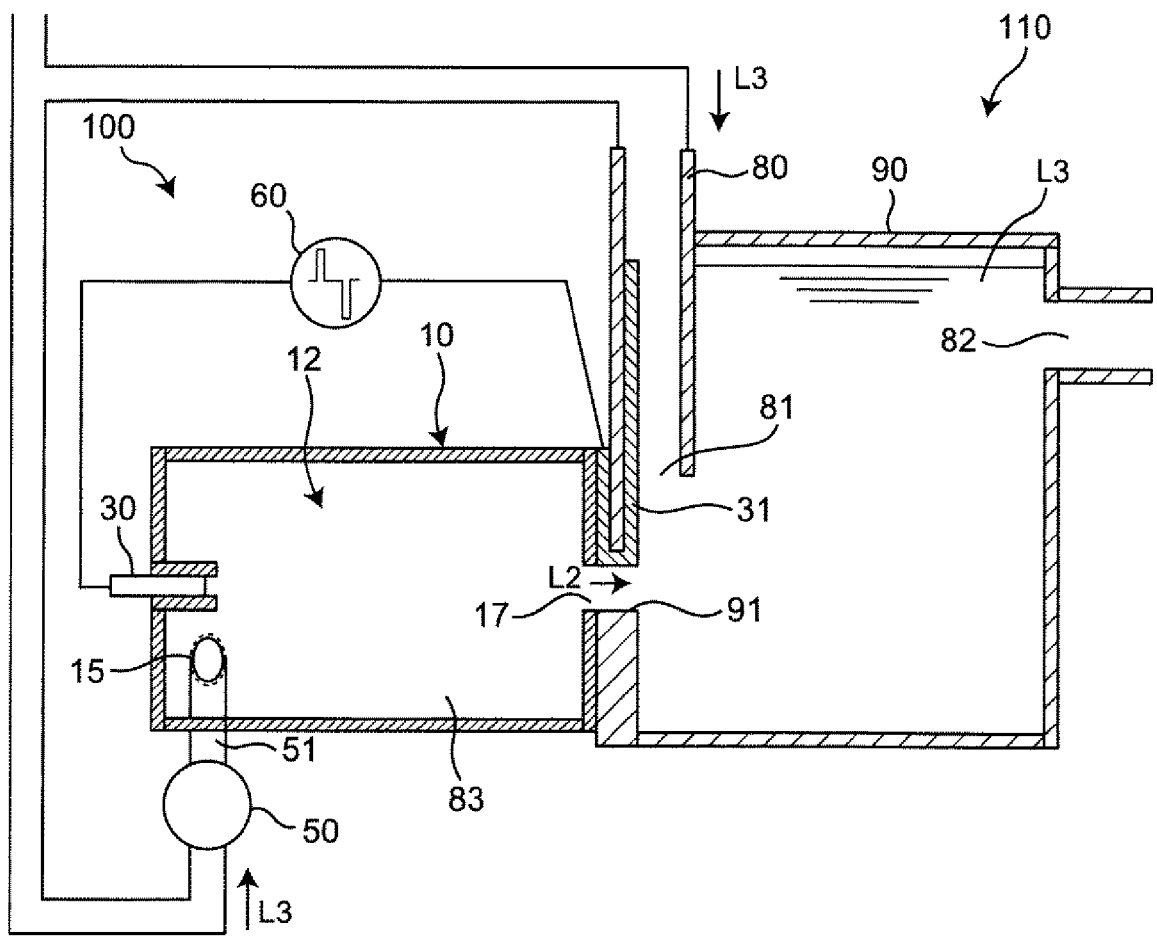
FIG. 13 is a side cross sectional view representing a variation of the device main body.
Figure 13:
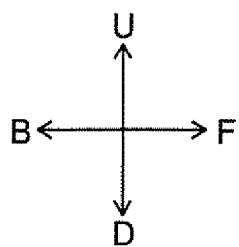
Figure 14:
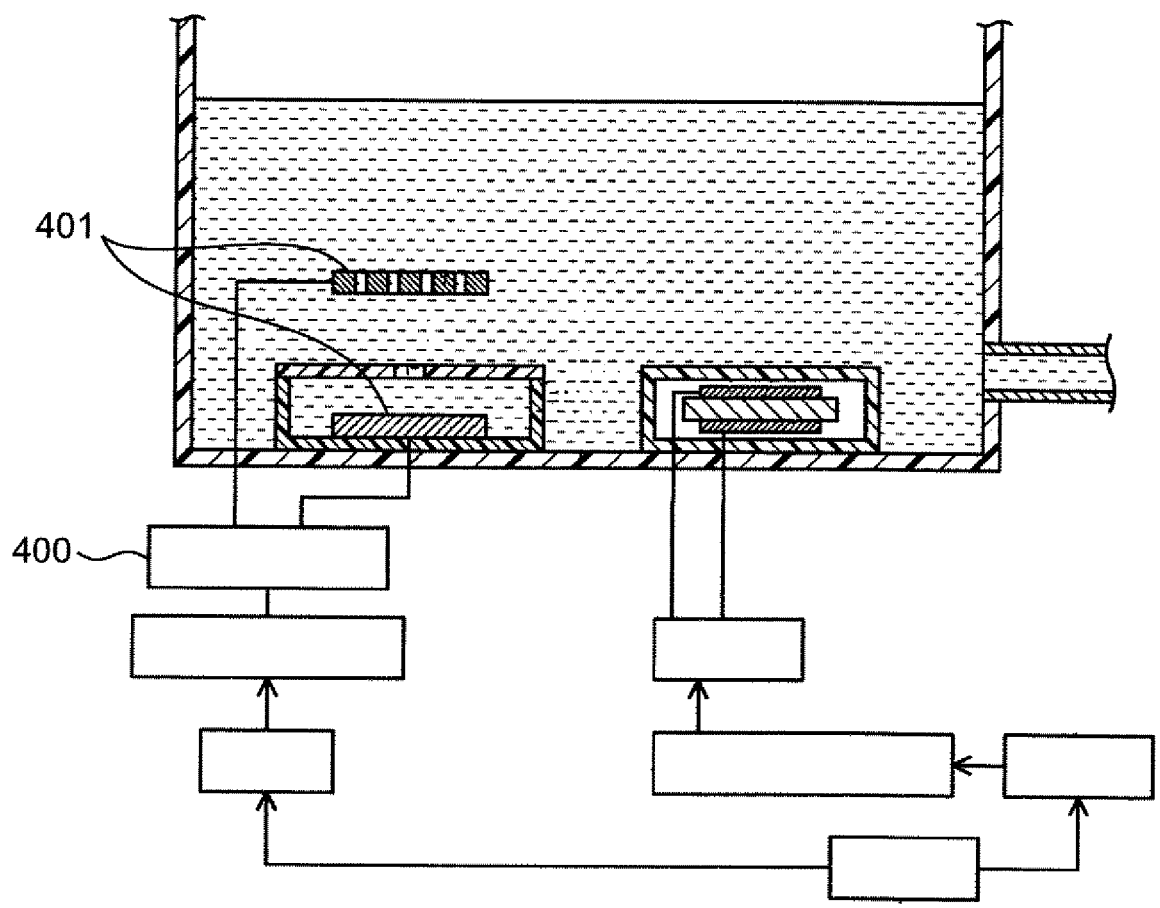
FIG. 14 is a cross sectional view of a traditional liquid treatment device.

As shown in FIG. 12, one end of the pipe 51 may be connected to a circulation pipe 84 so that the liquid to be treated L3 containing the treated liquid L2 in the second treatment vessel 90 can circulate through a water intake section 16 from regions near a stored water ejection opening 82. The same effect also can be obtained with this configuration. It is also possible, as shown in FIG. 13, to branch the pipe 51 into the supply section 80, and supply the liquid to be treated L3 to both the first treatment vessel 12 and the supply section 80. The same effect also can be obtained with this configuration.

While there have been described a certain embodiment and a variation of the present disclosure, the embodiment and the variation described above are merely examples of implementations of the present disclosure. Accordingly, the present disclosure is not limited to the foregoing embodiment and variation, and the foregoing embodiment and variation may be modified as appropriate within the gist of the present disclosure. For example, the foregoing embodiments and variations can exhibit their effects even when any of the embodiments or variations is appropriately combined with another embodiment or variation. It is also possible to combine different embodiments or different Examples, or combine embodiments and Examples. The features of different embodiments or Examples also may be combined.

In the liquid treatment device according to the aspect of the present disclosure, a plasma is generated in liquid, and the generated hydrogen peroxide is forcibly mixed with a liquid to be treated containing copper ions or iron ions generated through electrolysis at the anode. In this way, the Fenton's reaction occurs more effectively, and the liquid can be treated through decomposition and sterilization of suspended substances or microorganisms in the liquid. A liquid still containing contaminants or microorganisms after the treatment is introduced to generate plasma, and is brought into direct contact with the plasma or passed through a plasma generated regions. The UV light, radicals, and other chemical species generated by plasma discharge can then be used to treat liquid through decomposition and sterilization. This makes the liquid treatment device applicable to a wide range of environment improvements, such as sterilization and deodorizing.

What is claimed is:

1. A liquid treatment device comprising:
    a first treatment vessel that is cylindrical in shape and having a closed end at a first end of a central axis of the vessel and a circular cross section orthogonal to the central axis, the first treatment vessel including on a first end side of the central axis a liquid inlet through which liquid is introduced in a tangential direction of the circular cross section of the vessel, and that causes the liquid to swirl around the central axis and generate a gas phase in a swirl flow of the liquid;
    a first electrode that is rod-like in shape and disposed on the first end side of the central axis of the first treatment vessel;
    a second electrode made of a copper- or iron-containing metal and disposed on a second end side of the central axis of the first treatment vessel;
    a liquid ejecting section through which the liquid is ejected from the first treatment vessel in the form of a treated liquid;
    a second treatment vessel in which the treated liquid ejected through the liquid ejecting section mixes with a liquid to be treated;
    a power supply that applies a voltage between the first electrode and the second electrode in a way that applies a positive voltage to the second electrode, and causes copper ions or iron ions to dissolve out of the second electrode into the liquid to be treated in the second treatment vessel; and
    a supply section that supplies the liquid to be treated to the second treatment vessel in a direction that differs from a direction of a jet of the treated liquid ejected from the first treatment vessel,
    wherein an ejected liquid flow of the treated liquid ejected from the first treatment vessel swirls in an opposite direction from a swirl direction of a supply liquid flow of the liquid to be treated supplied to the second treatment vessel through the supply section.

2. The liquid treatment device according to claim 1, wherein the second end side of the central axis of the first treatment vessel where the second electrode is disposed is an inner wall surface of the supply section.

3. The liquid treatment device according to claim 1, wherein the second end side of the central axis of the first treatment vessel where the second electrode is disposed is a wall surface of the second treatment vessel on a closer side to the first treatment vessel.

4. The liquid treatment device according to claim 1, wherein the second end side of the central axis of the first treatment vessel where the second electrode is disposed is a wall surface at the second end of the central axis in the first treatment vessel for a first end portion of the second electrode, and is an inner wall surface of the supply section for a second end portion of the second electrode connected to the first end portion through the liquid ejecting section.

5. The liquid treatment device according to claim 1, wherein the first treatment vessel further has a shape that combines cylinders of different radii.

* * * * *